April 26, 1966 G. N. ROMINE ETAL 3,247,991
APPARATUS FOR PALLET HANDLING
Filed Dec. 5, 1963 3 Sheets-Sheet 3
FIG. 7
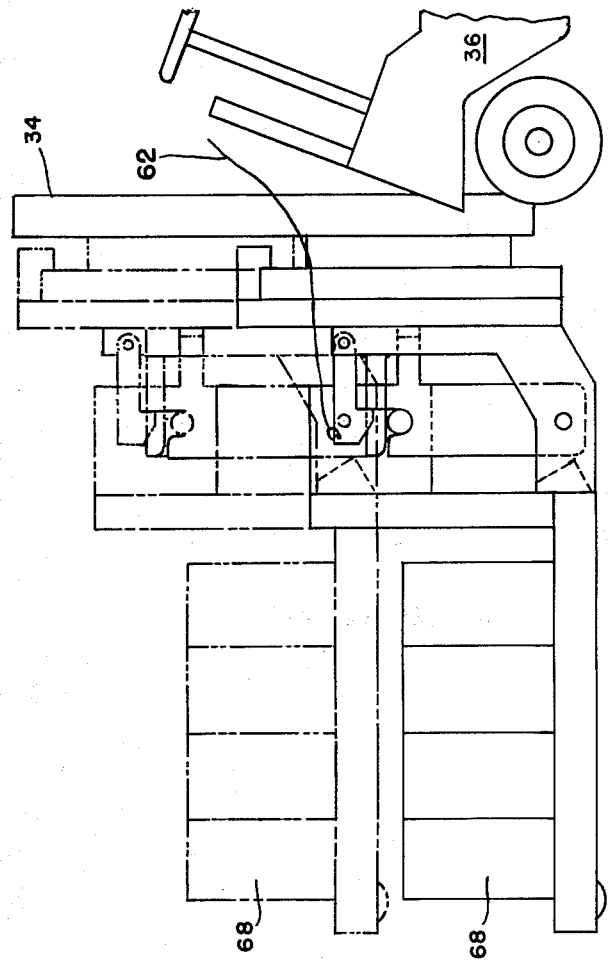
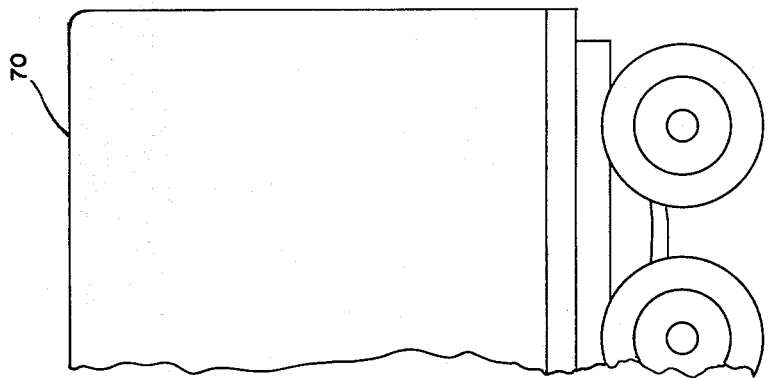
INVENTORS,
GLENN N. ROMINE
MAURICE J. PAQUIN United States Patent Office 3,247,991
Patented Apr. 26, 1966

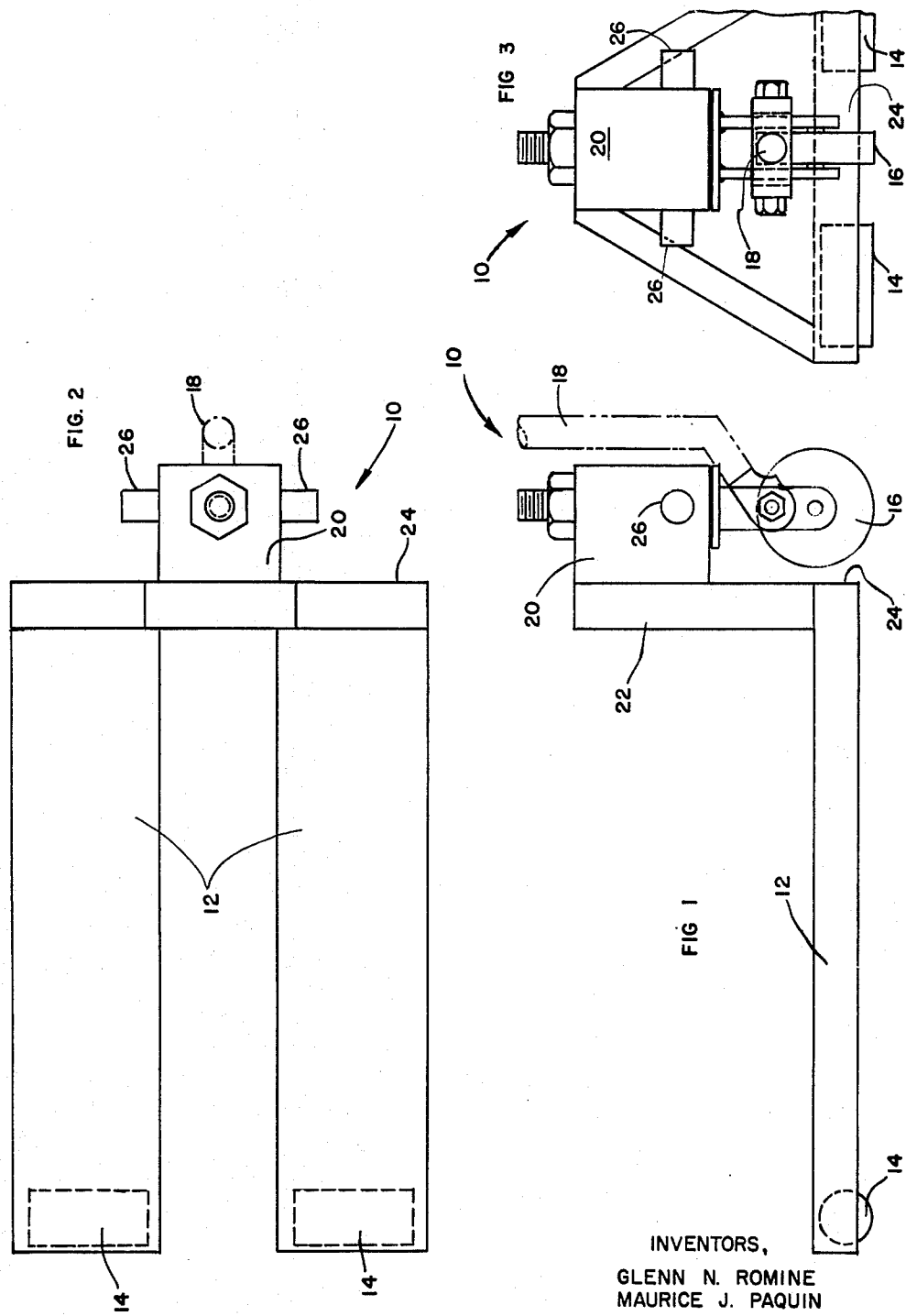
April 26, 1966     G. N. ROMINE ETAL     3,247,991
APPARATUS FOR PALLET HANDLING
Filed Dec. 5, 1963     3 Sheets-Sheet 1
INVENTORS,
GLENN N. ROMINE
MAURICE J. PAQUIN

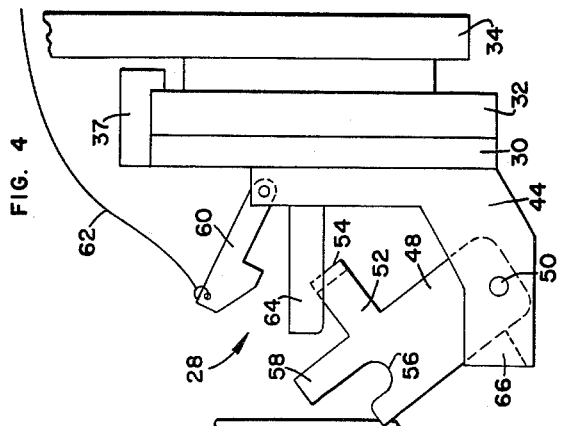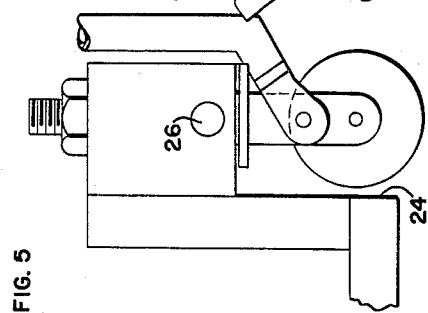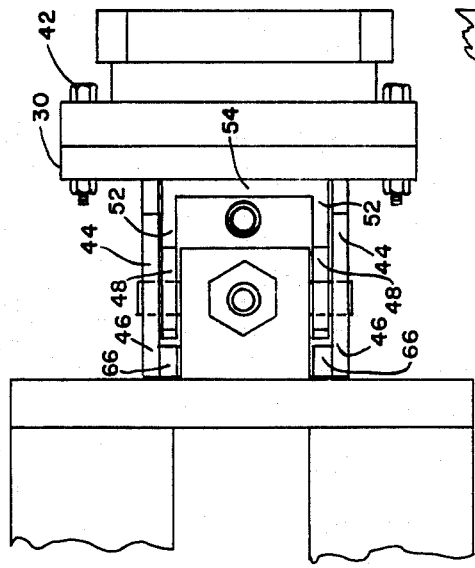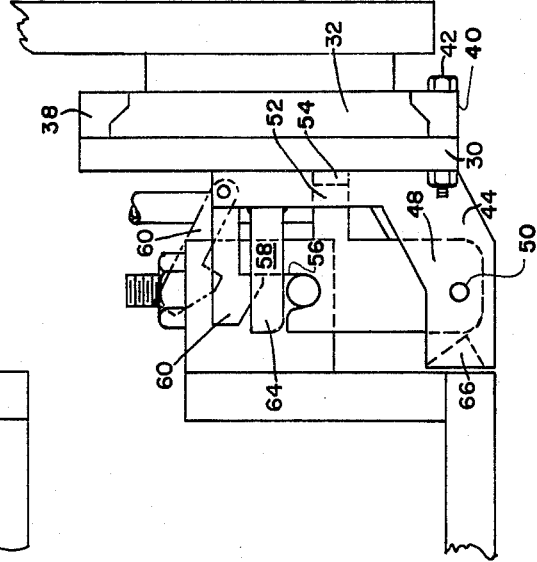

3,247,991
APPARATUS FOR PALLET HANDLING
Glenn N. Romine, 35629 Columbia St., Wayne, Mich., and Maurice J. Paquin, Midland Park, N.J.; said Paquin assignor to said Romine
Filed Dec. 5, 1963, Ser. No. 328,411
3 Claims. (Cl. 214—621)

The present invention relates to method and apparatus for handling cargo and more particularly to a method and apparatus for utilizing a lift truck to lift, transport, and lower a pallet truck or other cargo support means.

Conventional cargo support means, such as pallet trucks, pallets, skid platforms, and dollies, are not provided with self-contained means for raising themselves or their cargo vertically above the floor or deck upon which they rest. Further, even pallet trucks have only limited horizontal movement since they are provided with small wheels and are often too heavy for extended manual movement when loaded. Still further, even when a pallet truck has been loaded and moved to a van, loading dock, or stack of material atop which it is desired to place its cargo, a lift truck must be procured and brought to the site to elevate and place the cargo on the truck, dock, or stack of material. Often the cargo still requires further movement, as into a warehouse or to the front of a van, and, unless this is to be done manually, a pallet truck or dolly must be brought to the site and elevated to the bed of the van or platform of the loading dock and the cargo shifted thereto. This procedure is troublesome, expensive and time consuming.

It is accordingly an object of this invention to provide an improved method for handling cargo.

Another object of the invention is to provide apparatus for utilizing a lift truck to lift, transport, and lower cargo support means.

A further object of the invention is to provide an improved pallet truck adapted to be lifted, transported, and lowered by a lift truck.

The above and other objects of the invention which will later become apparent as the following description proceeds, are attained by the present invention, a preferred embodiment of which has been illustrated, by way of example only, in the accompanying drawings, forming a part of this specification in which like characters are employed to designate like parts throughout the same, and wherein:

FIGURE 1 is a side view of an improved pallet truck.
FIGURE 2 is a plan view of an improved pallet truck.
FIGURE 3 is a rear view of an improved pallet truck.
FIGURE 4 is a side view of support means attached to the vertical rails of a lift truck and in open position, and of the rear portion of an improved pallet truck disengaged therefrom.
FIGURE 5 is a side view of support means attached to the vertical rails of a lift truck operatively engaging the rear portion of an improved pallet truck.
FIGURE 6 is a plan view of support means attached to the vertical rails of a lift truck operatively engaging the rear portion of an improved pallet truck.
FIGURE 7 is a side view of support means attached to the vertical rails of a lift truck, operatively gripping an improved pallet truck with cargo thereon and in process of lifting and transporting same onto the bed of a van.

Referring now more particularly to the drawings, best shown in FIGURES 1, 2, and 3 is an improved pallet truck generally indicated at 10. Pallet truck 10 includes a conventional fork-like horizontal frame 12, a pair of forward rollers 14, a vertically adjustable rear wheel 16, and a handle 18. Wheel 16 is retractable by means of conventional retracting mechanism 20 connected to a rear wall 22 of truck 10. Wheel 16 and retracting mechanism 20, however, are arranged in such a position with respect to platform 12 that when the wheel is retracted it lies entirely above the plane of platform 12, completely exposing the rear end 24 of the platform for a purpose more particularly hereinafter described. A pair of metal trunnions 26, 26, preferably formed of steel or aluminum, are provided and extend transversely from the sides of retracting mechanism 20. Trunnions 26, 26 may be butt welded to the sides of the housing of retracting mechanism 20 but are preferably formed from the exposed, opposite ends of a cylindrical steel bar extending horizontally through the housing of the retracting mechanism and secured to the housing thereof by welding.

Referring now to FIGURE 4, we provide unique means generally shown at 28 for releasably gripping and supporting pallet truck 10. A backplate 30 is supported upon the conventional fork mounting plate 32, which extends forwardly from the mast 34 of a lift truck 36, by a simple hook 37 welded across and extending rearwardly from the top of backplate 30 and over and down the top and upper rear of the fork mounting plate. In the alternative, backplate 30 may be connected to fork mounting plate 32 by an upper hook member 38 welded across the top of backplate 30 and, further, by a clamping member 40 releasably connected across the bottom of backplate 30 as by bolt and nut combinations 42, as best shown in FIGURES 5 and 6.

A pair of L-shaped main support brackets 44, 44 are welded to the front of plate 30 in spaced, parallel, vertical arrangement with the legs 46, 46 thereof extending forwardly. A pair of elongated cradle arms 48, 48 are pivotally supported in parallel arrangement by pivot pins 50, 50 extending through the lower portions thereof and through legs 46. A pair of spacer arms 52, 52 extend rearwardly from cradle arms 48, 48, respectively, and a tiebar 54 is welded therebetween. A pair of cradles 56, 56 are formed in the upper end of cradle arms 48, 48, respectively, and each cradle arm extends upwardly at the rear of each cradle to form a pair of cradle arm extensions 58, 58. A pair of latch members 60 are pivotally connected to the inner side of the vertical arms of main support brackets 44, 44, and are arranged to engage from above the forward side of cradle arm extensions 58, 58 when cradle arms 48, 48 are in their vertical position with spacer arms 52, 52 resting against backplate 30, so as to releasably retain the cradle arms from pivotal forward movement. Means, such as the ring and rope combination 62 shown in FIGURE 4, are provided for pivotally raising latch member 60 to release cradle arms 48, 48. One end of a horizontal retaining arm 64 is welded to the vertical arm of each L-shaped support member below the pivotal attachment of latch 60 thereto and extends across the top of trunnion 26 when it is received within yoke 56 and cradle arm 48 is in its vertical position. A pair of bosses 66 are welded to the inner sides of legs 46, 46 at the forward ends thereof to provide stops limiting forward pivotal movement of cradle arms 48, 48.

In operation, with wheel 16 retracted and support 28 in open position as shown in FIGURE 4, lift truck 36 is maneuvered into such a position that trunnions 26, 26 contact the forward surface of cradle arm extensions 58, 58 immediately above cradles 56, 56, and by further forward movement of the lift truck cradle arms 48, 48 are caused by the trunnions to pivot rearwardly about pivot pins 50 until they have assumed a vertical position with the trunnions received within the cradles, and extensions 58, 58 of cradle arms 48, 48 are engaged by latches 60, 60 respectively, as best shown in FIGURES 5 and 6. The length of legs 46, 46 are carefully selected so that, when cradle arms 48, 48 are in such vertical position with trunnions 26, 26 received within cradles 56, 56, the forward ends of feet 46, 46 contact and abut rear end 24 of pallet truck 12. When support means 28 is elevated, the weight of pallet truck 10 is supported by trunnions 26 and the torque created by the offset of the axis of the trunnions from the center of gravity of the pallet truck is countered by the abutment of rear end 24 against the forward edge of feet 46, 46. Platform 12 is thus retained in a horizontal position when support means 28 and pallet truck 10 are moved horizontally or vertically, or both by lift truck 36.

Support mechanism 28 with pallet truck 10 thus securely gripped and supported thereby may then be raised and lowered upon mast 34 of lift truck 36 by the conventional lift mechanism of the truck, as illustrated in FIGURE 7. When thus elevated, the assembly, including the cargo 68 borne by pallet truck 10, may be moved horizontally from one position to another within a factory, or from building to building, to a desired unloading site. At the site, pallet truck 10 may be lowered to the ground or other horizontal surface, such as the bed of van 70, by operation of the conventional lift mechanism of truck 36. By pivotally raising latch 60, cradle arms 48, 48 are released for pivotal forward movement when fork truck 36 is backed up, whereby trunnions 26, 26 will be disengaged from yokes 56, 56 as best shown in FIGURE 4. Pallet truck 10, with cargo 68 thereon, may then be moved directly by hand to a desired location at the unloading site, as to the forward portion of the bed of van 70, and cargo 68 then unloaded therefrom in the conventional manner. Pallet truck 10 may then be reengaged by support mechanism 28, returned to its point of origin, and lowered to the ground in a similar manner.

It should be particularly noted that our invention is not confined to pallet trucks, but may be used with skid platforms, dollies, and other cargo support means which are not designed for elevation of cargo or, in many instances, even for horizontal transport of cargo.

It is to be understood that the form of the invention herewith shown and described is to be taken as a preferred embodiment of the same and that resort may be had to various changes in construction without departing from the scope of the subjoined claims.

What is claimed is:

1. In combination with lift means, a pair of support brackets connected to said lift means, a pair of legs extending forwardly from the lower portions of said support brackets, respectively, a pair of cradle arms pivotally supported upon said legs, respectively, and adapted to swing between a vertical position and a forwardly inclined position, each cradle arm bearing a cradle at the upper end thereof, pallet means, a pair of trunnions extending from said pallet means above the frame thereof and disposed to be received within said cradles when said cradle arms are forwardly inclined, the frame of said pallet means abutting the forward ends of said legs when said cradle arms are in vertical position with said trunnions received therein, and latch means adapted to releasably retain said cradle arms in a vertical position, to releasably engage said pallet means with said lift means for vertical movement of said pallet means.

2. Means for releasably engaging pallet means with the lift means of a lift truck comprising, a backplate supported upon the fork mounting plate of said lift means, a pair of L-shaped support brackets mounted upon said backplate in spaced, parallel, vertical arrangement with the legs thereof extending forwardly, a pair of elongated cradle arms pivotally supported in parallel arrangement near their lower ends upon said legs to swing between a vertical position and a forwardly inclined position, a pair of spacer arms, having a tiebar therebetween, extending rearwardly from said cradle arms, respectively, to contact said backplate when said cradle arms are in a vertical position, a pair of cradles formed in the upper ends of said cradle arms, respectively, each of said cradle arms having a cradle arm extension extending upwardly beyond said cradle at the rear thereof, a pair of trunnions supported by and extending laterally from said pallet means above the platform thereof and disposed to be received within said cradles, respectively, when said cradle arms are forwardly inclined, and latch means adapted to releasably retain said cradle arms in a vertical position, the forward ends of said legs being disposed to abut the rear of the frame of said pallet means when said cradle arms are in a vertical position with said trunnions received within said cradles, to releasably engage said pallet means with said lift means for vertical movement thereof by said lift means and horizontal movement thereof by said lift truck.

3. In a lift truck having lift means, a backplate supported upon the fork mounting plate of said lift means, a pair of L-shaped support brackets mounted upon said backplate in spaced, parallel, vertical arrangement with the legs thereof extending forwardly, a pair of elongated cradle arms pivotally supported in parallel arrangement near their lower ends upon said legs to swing between a vertical position and a forwardly inclined position, a pair of spacer arms extending rearwardly from said cradle arms, respectively, to contact said backplate when said cradle arms are in a vertical position, a tie bar extending between said cradle arms, a pair of cradles formed in the upper ends of said cradle arms, respectively, each of said cradle arms having a cradle arm extension extending upwardly beyond said cradle at the rear thereof, said cradle arms being disposed to receive a pair of trunnions extending laterally from a pallet truck above the platform thereof when said cradle arms are forwardly inclined, the forward ends of said legs being disposed to abut the rear of the frame of said pallet truck when said cradle arms are in a vertical position with said trunnions received within said cradles, and latch means adapted to releasably retain said cradle arms in a vertical position, to releasably engage said pallet truck with lift means.

References Cited by the Examiner

UNITED STATES PATENTS

| 2,636,568 | 4/1953 | Rutishauser | 180—53.6 |
| 2,669,314 | 2/1954 | Quayle | 180—12 |
| 2,809,759 | 10/1957 | Manker | 214—620 |
| 2,944,689 | 7/1960 | Arnot | 214—620 |
| 3,074,500 | 1/1963 | Ulinski | 180—13 X |

FOREIGN PATENTS 1,100,076  3/1955  France.

GERALD M. FORLENZA, *Primary Examiner.*

MORRIS TEMIN, HUGO O. SCHULZ, *Examiners.*